July 15, 1952 W. L. MORRISON, JR., ET AL 2,603,676
MAGNETIC POWER UNIT SHOCK ABSORBER
Filed Sept. 28, 1949
2 SHEETS—SHEET 1
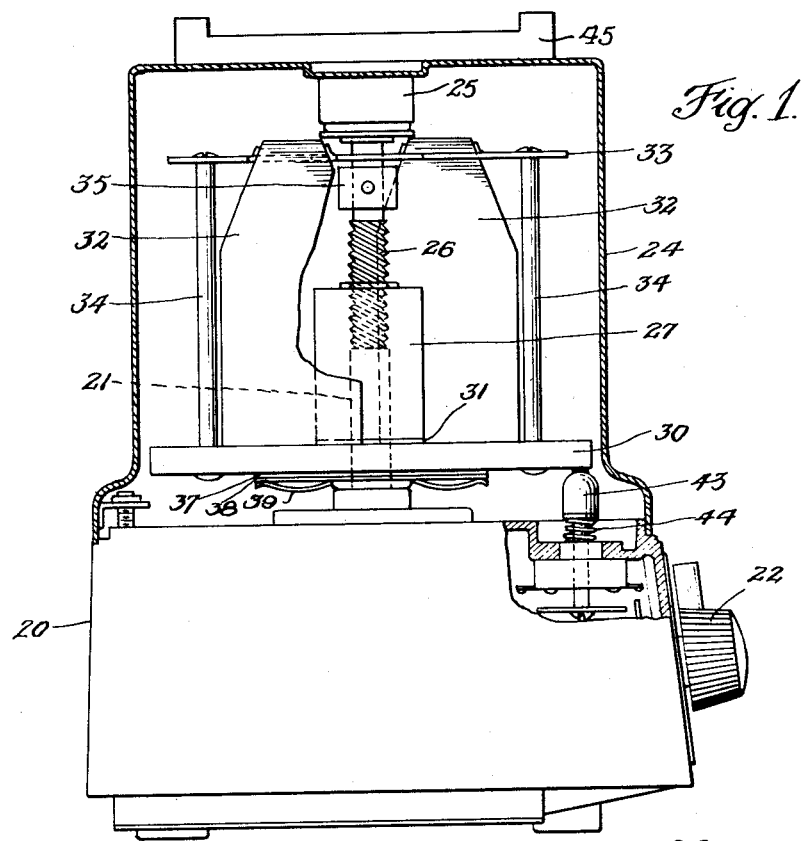
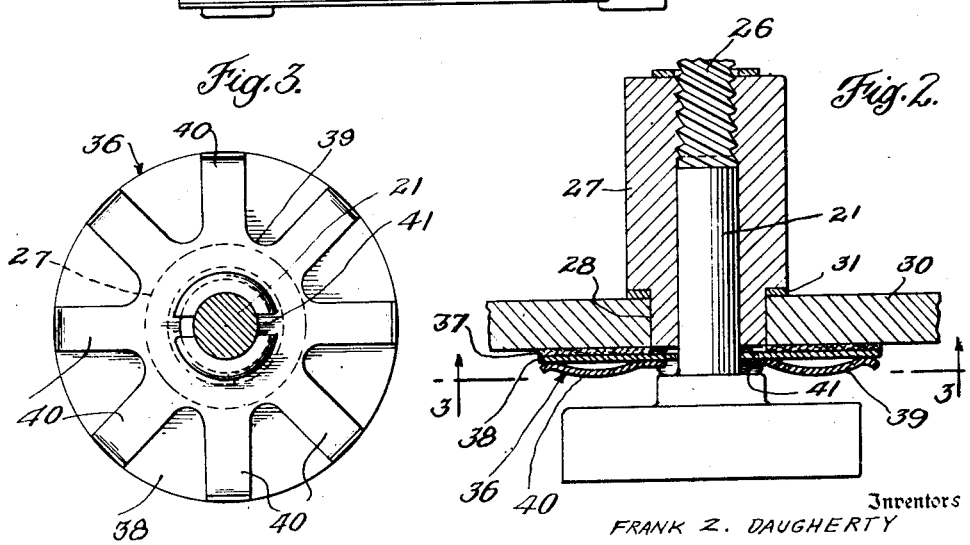
Inventors
FRANK Z. DAUGHERTY
AND WILLARD L. MORRISON JR.
Attorneys

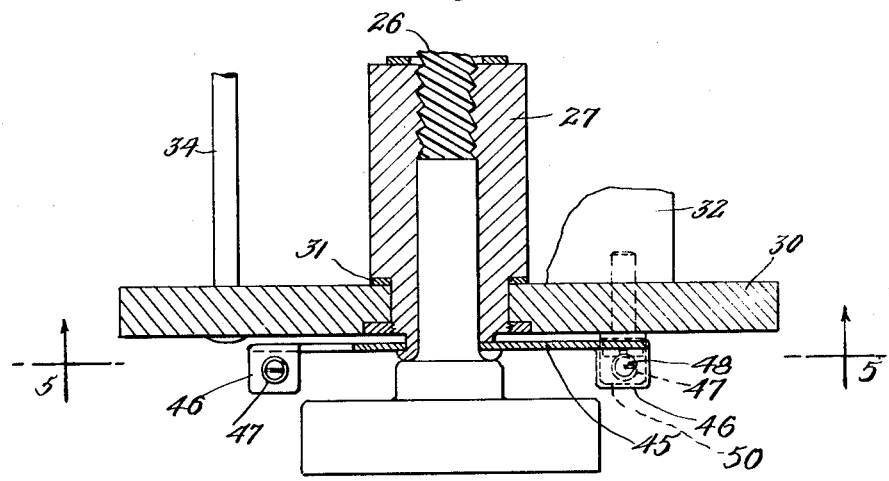
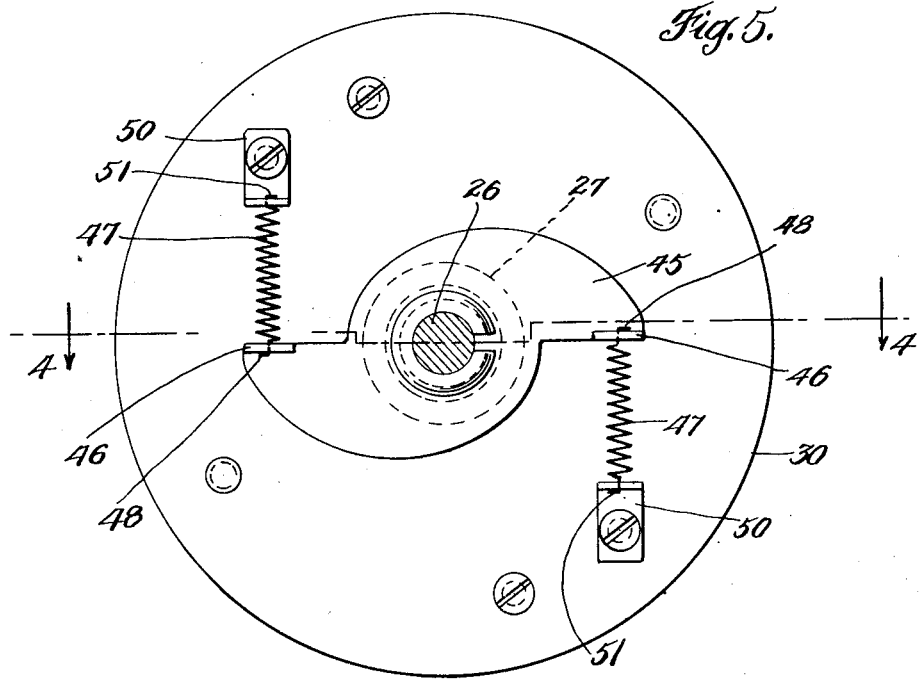
INVENTORS
FRANK Z. DAUGHERTY
AND WILLARD L. MORRISON JR.

Patented July 15, 1952

2,603,676

UNITED STATES PATENT OFFICE 2,603,676

MAGNETIC POWER UNIT SHOCK ABSORBER

Willard L. Morrison, Jr., Akron, and Frank Z. Daugherty, Kent, Ohio, assignors to Magnetic Power, Inc., Wilmington, Del., a corporation of Delaware Application September 28, 1949, Serial No. 118,306

4 Claims. (Cl. 172—284)

The present invention relates to magnetic power units in which a remotely located permanent magnet provides a turning magnetic field which turns a keeper, causing the keeper to do work incident to such operations as mixing, stirring, homogenizing, juicing and operation of tools and implements.

A purpose of the invention is to relieve against abnormal torque in the operation of a turning magnet and particularly to minimize the effect of shock torque when the magnet abruptly ceases to move relative to its driving shaft.

A further purpose is to interpose a slip clutch between a permanent magnet and its driving shaft.

A further purpose is to provide a torsional shock absorber between a threaded nut operating on the driving shaft and the rotor on which the magnet is supported.

A further purpose is to move a turnable magnet axially on its driving shaft and to take up shock at the limits of motion by interposing a slip clutch between the shaft and the magnet.

A further purpose is to adjust the slippage in the slip clutch to a level which is higher than the slippage torque between the magnet and keeper so that the slip clutch will normally transmit power as a rigid element and will only slip under abnormal torque such as shock direction of motion.

Further purposes appear in the specification and in the claims.

In the drawings we have chosen to illustrate one only of the numerous embodiments in which our invention may appear, choosing the form shown from the standpoints of convenience in illustration, satisfactory operation and clear demonstration of the principles involved.

Figure 1 is a side elevation partly in central vertical section of a magnetic power unit in accordance with the invention.

Figure 2 is an enlarged fragment of Figure 1 showing the nut and the lower portion of the rotor in central vertical section.

Figure 3 is a section of Figure 2 on the line 3—3.

Figure 4 is a section corresponding to Figure 2, showing a variation sectioned on the line 4—4 of Figure 5.

Figure 5 is a section of Figure 4 on the line 5—5.

Magnetic power units of the type disclosed and claimed in Jerome L. Murray U. S. patent application Serial No. 771,176, filed August 29, 1947, for Mixer and Processor for Home Use and the Like, of which the present invention is an improvement, offer many advantages for the operation of stirrers, mixers, homogenizers, juicers and small implements and appliances, in the home and especially in the kitchen.

In devices of this character a permanent magnet is turned on a shaft and a remotely located keeper, which in the case of the stirrers and mixers is placed in a bowl or glass, is turned by the magnetic force without the use of direct mechanical connection between the magnet and the keeper.

In some such prior art devices the magnet has been located at a remote position when the device is active and is moved to a close coupling position with respect to the keeper when the device is started by threaded connection between the shaft and the magnet rotor. In such prior art devices, the keeper has been pulled away by hand at the end of the operating cycle, allowing the magnet to return by gravity along the threads on the shaft to its remote position. In an improvement of the basic device, forming the subject matter of Morrison et al. U. S. patent application Serial No. 118,305, filed September 28, 1949, now Patent No. 2,600,795, for Magnetic Power Unit Reversing Drive, the magnet is moved from its close coupling to its remote position with respect to the keeper by reversing the direction of drive of the shaft.

In the basic magnetic power units of the prior art, when the magnet is moved to its close coupling position in starting the power unit, as soon as it reaches the limit of axial motion on the thread in the shaft the magnet is abruptly stopped against further rotational motion relative to the shaft and must henceforth turn as one component with the shaft. This results in an abnormal shock torque which tends to jolt the whole mechanism torsionally every time the magnet comes to the end of its upward axial travel, tending to impair the operation of the moving parts, and causing annoyance or concern to the user. In the improved device of the Morrison et al. patent application above referred to a similar shock torque occurs at the end of the axial movement of the magnet to the remote position, similarly causing increased maintenance on the mechanism and proving annoying from the standpoint of the user.

In accordance with the present invention, these difficulties are overcome by providing a shock absorbing action preferably by a slip clutch acting torsionally and interposed between the shaft and the magnet. The most convenient arrangement has been found to be to locate a threaded nut on the driving shaft, and to support a rotor on the threaded nut with rotational freedom. The slip clutch is interposed between the nut and the rotor and the magnet is mounted in or on the rotor.

It is important of course that the slip clutch be adjusted to a minimum torque slipping value which is above any value which will be encountered in normal operation of the power unit. With this purpose in view, the keeper is designed to slip with respect to the magnet at a particular torque value which can be designated the magnetic slip torque limit. The torque slip limit of the slip clutch is then set for a value higher than the magnetic slip torque limit, preferably at least 10 percent higher. Under these conditions a normal working overload encountered by the keeper will be taken care of by magnetic slip of the keeper. On the other hand an abnormal shock torque such as that incident to movement of the magnet axially up or axially down to its limiting position is taken care of entirely by the mechanical slip clutch.

Where there are several keepers employed for different purposes, the magnetic slip torque limit will be determined for the heaviest keeper operating at the highest torque and with the closest coupling and the mechanical slip clutch will be set for a still higher value.

The magnetic power unit of the invention comprises a lower housing 20 containing an electric motor driving a vertical rotor shaft 21. The motor control switch is shown at 22 at the front of the housing. The shaft 21 is surrounded by a suitable non-magnetic casing 24 which supports an upper bearing 25 for the rotor shaft.

The shaft is threaded at 26 in the direction which will cause upward movement when the shaft turns forwardly, and the threads on the shaft make free running engagement with a surrounding nut 27. The nut is reduced at 28 to receive a rotor base 30 which is freely turnable with respect to the nut. A fibre washer 31 between the nut and the rotor base cushions the engagement.

The rotor base supports upstanding magnets 32 which are held at the top by a suitable non-ferrous plate 33 positioned by studs 34 secured to the base. A collar 35 on the shaft limits the upward movement of the unit and therefore of the rotor. The plate 33 is recessed to clear the bearing 25.

Secured to the bottom of the nut 27 as by means of peening over the lower end of the reduced portion 28 of the nut, and cooperating with the rotor base 30 is a slip clutch 36 comprising a clutch facing disc 37 of any suitable material such as fiber, a clutch pressure disc 38 and a load spring 39 having spring prongs 40 pressing against the pressure disc 38. The load spring 39 is held against rotating on the nut 27 by a key tab 41 as is also the pressure disc 38. The clutch facing disc is rotationally free. The clutch facing disc 37 engages the lower face of the rotor base 30.

It will thus be seen that the friction in the slip clutch as determined by the pressure of the spring washer determines the torque which will cause the rotor to move relatively rotationally with respect to the shaft.

The rotor base in its lower position may conveniently engage a shut-off switch 43 which is upwardly urged by a spring 44.

The magnetic power unit drives a keeper 45.

It will be noted that the cut-off switch exerts a frictional retardation on the rotor, and also that the spring of the cut-off switch urges the rotor upward when it is in its lowermost position.

In operation, the rotor will be in the lowermost position when the power unit is inactive. On turning on the switch to start the motor, the shaft will turn in the direction which, with the particular direction of the threads on the shaft, will move the rotor axially upward. It will be understood that during starting the rotor shaft builds up to a comparatively high speed while the rotor is still rising on the shaft and turning relatively slowly. When the rotor reaches the limit of its upward travel as determined by the threads or any other stop, the shock torque at the time the rotor ceases relative rotational movement with respect to the shaft and begins to turn entirely with the shaft will be taken up by tortional slippage of the rotor with respect to the nut at a torque level determined by the mechanical slip clutch. This torque level is somewhat higher than any torque which would create slippage between the magnet and its keeper, for the largest keeper with the closest spacing of air gap which is to be used.

During the normal turning of the magnet the slip clutch will not be called upon to function unless some failure of the mechanism occurs, in which case the slip clutch will operate to prevent or minimize damage of the parts.

When the cycle of operation is completed and it is desired to shut off the power unit, this can be accomplished in accordance with the Murray application above referred to by turning off the motor and manually removing the keeper to a remote point, in which case the rotor will move to the lower position on the threads. On the other hand the magnet may be moved to the remote position in accordance with the Morrison et al. application above referred to by reversing the motor and then shutting off the motor after the magnet moves to the lower position. In this case there will be a shock torque as the rotor reaches its limit of axial movement downward, due to the fact that the rotor shaft reverses when the rotor may still be moving forwardly, and the slip clutch will again absorb the energy of this shock torque. Both shock torques are likely to be momentarily considerably greater than any torque normally encountered during the normal operation of the device.

While reference has been made herein to a permanent magnet or magnets supported on a rotor for creating the turning magnetic field, questions of whether the magnetic driving field is created by a permanent magnet, an electromagnet or some combination of the same, or by magnets on a rotor or a magnet which forms the entire rotor are not critical in the present invention, and it will be understood that variations in these features may be employed if desired.

It will be evident that the shock absorber employed in the present invention may be of any suitable character, Figures 4 and 5 illustrating a variation which employs a spring connected between the nut and the rotor.

Figures 4 and 5 show a shock absorber of the spring type which is acting rotationally between the rotor and the nut. In this form the nut carries a shock absorber operating lever 45 suitably engaged to the nut by peening and carrying tangentially extending spring abutting lugs 46 engaging tension springs 47 which have hook engagement at 48 in the lugs. On the rotor base 30 and suitably secured by one of the magnet screws, opposing spring abutments 50 are provided, which similarly have recesses for hook engagement of the spring at 51. It will be evident that the springs act in tension in this form at either end of the travel of the nut on the threaded shaft, permitting shock energy to be absorbed by relative motion between the rotor and the nut at each end of the rotor travel.

It will be evident that the shock absorber employed in the present invention may take the form of an energy absorber such as a spring or of a friction energy dissipating device such as a slip clutch.

In view of our invention and disclosure variations and modifications to meet individual whim or particular need will doubtless become evident to others skilled in the art, to obtain all or part of the benefits of our invention without copying the structure shown, and we, therefore, claim all such insofar as they fall within the reasonable spirit and scope of our claims.

Having thus described our invention what we claim as new and desire to secure by Letters Patent is:

1. In a magnetic power unit to turn a keeper, a magnet having poles disposed to turn the keeper, a shaft supporting and turning the magnet, a threaded interconnection between the magnet and the shaft, stop means limiting the motion of the magnet longitudinally of the shaft, and a shock absorber interposed between the magnet and the shaft and adapted to slip rotationally at the limits of axial travel of the magnet with respect to the shaft.

2. In a magnetic power unit for turning a keeper, a threaded shaft, a nut making threaded connection with the shaft, a rotor supported on the nut and having rotational freedom with respect to the nut, a magnet on the rotor having poles disposed to turn the keeper, stops limiting the motion of the nut along the shaft in both directions, and a shock absorber between the nut and the rotor.

3. In a power unit for turning a keeper, a shaft, a motor adapted to turn the shaft, a magnet having poles disposed to turn the keeper and supported and rotated by the motor, a keeper cooperating with the magnet and turned by the magnet and slipping with respect to the magnet at a predetermined torque, a threaded interconnection between the shaft and the magnet adapted to move the magnet axially into the operative position, stops limiting the axial motion of the magnet and a slip clutch interposed between the shaft and the magnet and set to yield only at a higher torque than the torque at which the keeper slips.

4. In a magnetic power unit, a magnet adapted to turn, a magnetically susceptible keeper turned by the magnet and slipping at a predetermined torque level, a rotor mounting the magnet, a threaded nut extending axially of the rotor and supporting the rotor with rotational freedom of the rotor, stops limiting the axial movement of the rotor, a slip clutch interposed between the nut and the rotor and set to yield only at a torque level above the torque level at which the keeper yields, a threaded shaft in the nut and a motor driving the threaded shaft.

WILLARD L. MORRISON, Jr.
FRANK Z. DAUGHERTY.

REFERENCES CITED

The following references are of record in the file of this patent:

UNITED STATES PATENTS

| Number | Name | Date |
|---|---|---|
| 1,452,327 | Thompson | Apr. 17, 1923 |
| 1,754,675 | Frank | Apr. 15, 1930 |
| 1,903,832 | Nichols | Apr. 18, 1933 |
| 2,447,130 | Matulaitis | Aug. 17, 1948 |

FOREIGN PATENTS

| Number | Country | Date |
|---|---|---|
| 354,040 | Great Britain | Aug. 6, 1931 |
| 552,485 | Great Britain | Apr. 9, 1943 |